Jan. 26, 1932.  W. H. ROBERTSON  1,842,951
CASH REGISTER
Filed March 30, 1928   3 Sheets-Sheet 1

Inventor
William H. Robertson
By Earl Bust
Ralph E. Warfield
His Attorneys

Jan. 26, 1932.                W. H. ROBERTSON                1,842,951
                                CASH REGISTER
                      Filed March 30, 1928        3 Sheets-Sheet 2
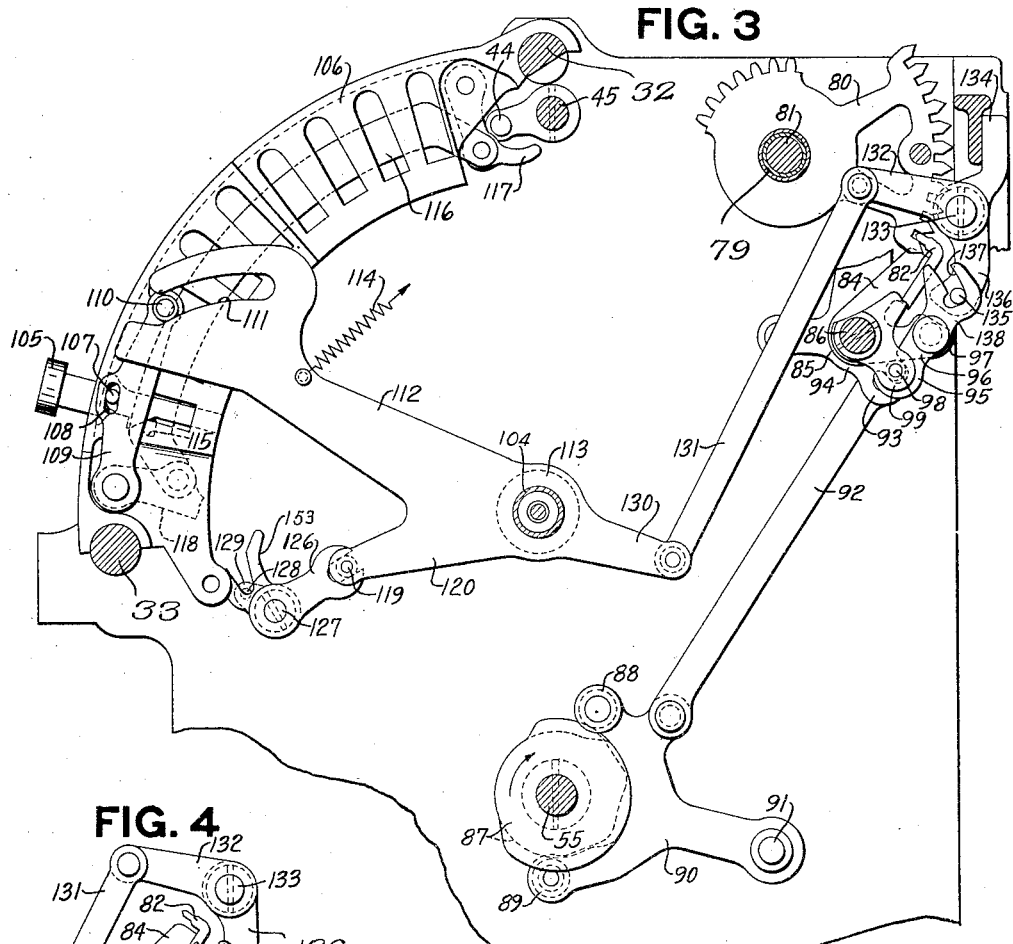
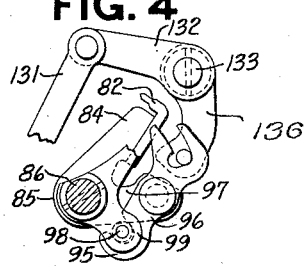
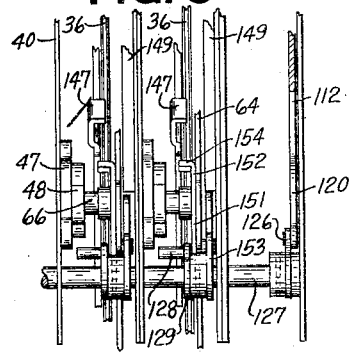
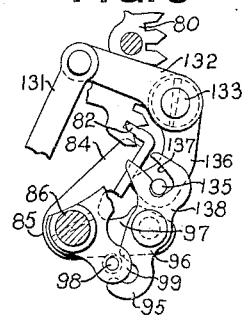
Inventor
William H. Robertson
By Pearl Beust
Ralph S. Warfield
His Attorneys Jan. 26, 1932.    W. H. ROBERTSON    1,842,951
CASH REGISTER
Filed March 30, 1928    3 Sheets-Sheet 3

Inventor
William H. Robertson
By Carl Beust
Ralph E. Warfield
His Attorneys

Patented Jan. 26, 1932

1,842,951

UNITED STATES PATENT OFFICE

WILLIAM H. ROBERTSON, OF DAYTON, OHIO, ASSIGNOR TO THE NATIONAL CASH REGISTER COMPANY, OF DAYTON, OHIO, A CORPORATION OF MARYLAND

CASH REGISTER

Application filed March 30, 1928. Serial No. 266,045.

This invention relates to cash registers and similar machines, and is particularly directed to improvements in repeat key mechanisms for such machines.

In various places of business, as in department stores, for example, the frequent occurrence of a succession of sales requiring the registration of a number of identical amounts makes desirable the inclusion, in a cash register or other accounting device, of a simple mechanism whereby the amount of the last transaction may be again added one or more times, either on the same or on a different totalizer, without necessitating the depression of the amount keys.

Heretofore, repeat mechanisms have been provided, operation of which prior to the registration of the first of a succession of identical amounts, resulted in disabling the key set restoring mechanism, to permit continued operation of the machine to add the amount the requisite number of times.

More recently, means has been devised whereby the operator need not know in advance that any amount set up is to be added or otherwise handled on the succeeding action, it being possible for the operator to effect repeated addition of the last amount previously registered, after such registration has taken place and prior to the next registration.

The present invention relates more especially to the last-named class of repeat mechanisms, one object being to simplify and improve the prior inventions to the end that mechanisms constructed in accordance therewith may be more easily and readily operated, to reduce the expense of manufacture.

Another object of this invention is to provide a cash register, or an adding, calculating, or accounting machine, with a novel device by the use of which an amount set up on the differentially movable members incident to machines of this nature may be again registered upon the same or any other totalizer in the machine at will upon the next succeeding operation of the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 3 is a detail sectional view, showing the repeat key and the mechanism controlled thereby.

Fig. 4 is a fragmentary detail view of the aligner disabling mechanism.

Fig. 5 is a fragmentary view in front elevation of the latch disconnecting mechanism.

Fig. 6 is a fragmentary side view similar to Fig. 4 showing the aligner held in its effective position by the repeat key-controlled mechanism, and the operating mechanism for the aligner disconnected therefrom.

Figure 2:
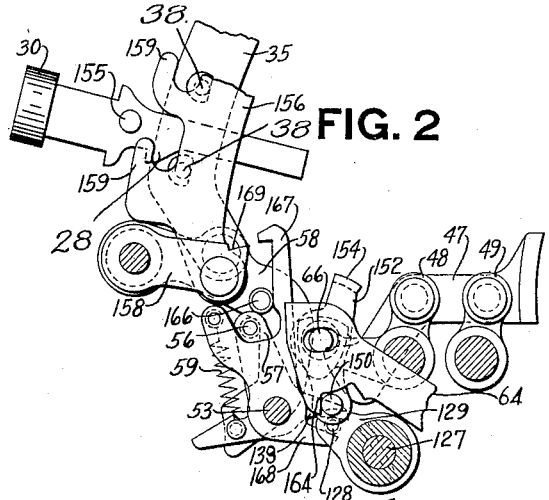
Fig. 2 is an enlarged view of the interlock between the repeat key and the amount keys, and shows a portion of the mechanism, controlled by the repeat key, for rocking the zero stop pawls out of effective positions.

The invention is adapted to be applied to a type of machine well known in the art and illustrated in the patents to F. L. Fuller, No. 1,242,170, issued October 9, 1917, and to B. M. Shipley, No. 1,619,796, issued March 1, 1927. Reference may be had to these patents for a full understanding of the machine.

The machine to which the present invention is shown applied, includes generally, a plurality of totalizers, with means to select any totalizer for operation, and a plurality of banks or rows of depressible keys mounted in key frames removably supported upon cross rods extending between the main side frames of the machine. Differential mechanism is associated with and controlled by each of the banks of keys for the purpose of adjusting various elements of the machine, including the totalizer actuator for each bank, to add amounts on the selected totalizer.

The invention includes, specifically, a repeat mechanism adapted, under the control of a repeat key, to arrest the differentially adjustable totalizer actuators in the positions to which they were adjusted on the preceding operation, thereby accumulating on any totalizer in the machine the amount of the last preceding transaction, without requiring depression of the amount keys to again set up the amount to be added into the totalizer, or knowledge on the part of the operator that such preceding amount is to be again added, prior to the first entry of such amount in the machine.

The amount keys and the differential mechanism controlled thereby, are of a type old and well known in the art for which reason only a brief description thereof follows:

The amount keys 30 (Fig. 1) of each denominational row are slidably mounted in a key frame 31, removably supported on cross rods 32 and 33, extending between the main side frames 34 of the machine, only one of which frames is shown herein. The stems of the keys 30 have shoulders 28 co-acting with studs 38 projecting from a slidable detent bar 35 pivotally supported at its upper and lower ends by links 46 and 58, respectively.

Depression of a key 30 crowds the detent bar 35 longitudinally and interposes the inner end of said key in the path of the usual latch mechanism carried by a differentially movable totalizer actuator 36. A zero stop pawl 37 arrests the actuator 36 in the zero position when no key in the particular bank is depressed. Operation of the detent bar 35 shifts the zero stop pawl 37 to its ineffective position. The stop pawl 37 is fast on one end of a short shaft 53, journaled in the key frame 31. A stud 56 on an arm 57 (Figs. 2 and 8) fast on the other end of the shaft 53, projects across the path of the link 58 supporting the lower end of the detent bar 35.

When a key 30 is depressed and the detent bar 35 shifts downwardly, the link 58 rocks clockwise and turns the arm 57, shaft 53 and the zero stop pawl 37 counter-clockwise to shift the pawl to its ineffective position.

After the key 30 is fully depressed, a spring 59 moves the detent bar 35 upwardly until the stud 38 contacts an edge 29 above the shoulder 28 on the key stem. The shoulder 28 thus holds the key in its depressed position, and as the key stem is wider at the point 29 than that section below the shoulder 28, the detent bar 35 cannot return to its normal position, and consequently, the zero stop pawl 37 is maintained in its ineffective position. The depressed key is released near the end of the operation of the machine by a key release bail 44 (Fig. 1), carried by a plurality of arms (only one of which is shown) fast on a release shaft 45, journaled in the machine frames 34. This release shaft rocks counter-clockwise near the end of each operation of the machine by well-known means and presses the bail 44 against a toe on the link 46, which supports the detent bar 35 at its upper end, thereby shifting the detent bar downwardly to disengage the stud 38 from the shoulder 28 on the key stem, whereupon a spring (not shown) restores the key to its normal undepressed position.

After the key is released, the spring 59 rocks the arm 57, shaft 53 and stop pawl 37 clockwise to normal positions, and, at the same time, rocks the links 46, 58 counter-clockwise to return the detent bar 35 to its normal position.

*Differential mechanism*

A differential mechanism, including a totalizer actuator 36 journaled on a hollow stud 39 in a bracket 40, supported on cross rods 41 and 42 extending between the machine frames, is associated with each of the banks of amount keys, for the purpose of accumulating on the totalizers the various amounts set up on the amount keyboard, and for differentially positioning various other elements of the machine, such as the indicators, and printing mechanism, none of which is shown herein.

Figure 9:
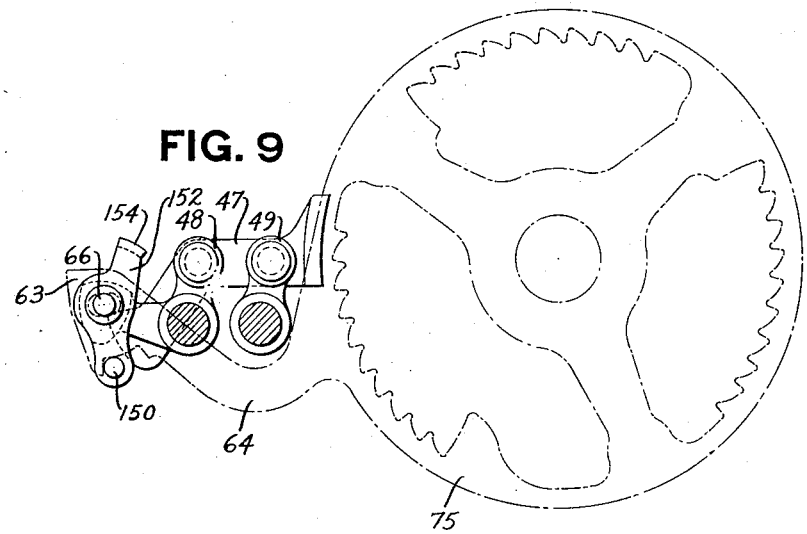
Fig. 9 is an enlarged detail of the tappet carried by the differential latch bell crank.

A latch 47 (Figs. 1, 2 and 9) pivotally supported on the actuator 36 by a bell crank lever 48 and a link 49, connects the differentially movable actuator 36 with an invariably movable driving segment 50. A link 51 connects the driving segment with a bell crank lever 52, pivotally supported on the bracket 40, and operated by a pair of cam disks 54 fast on a drive shaft 55. This drive shaft receives one complete rotation in a clockwise direction, as viewed in Fig. 1, at each operation of the machine, to rock the bell crank lever 52 and the drive segment 50 first clockwise, and then counter-clockwise back to normal position. The drive segment 50, on its clockwise movement, carries the actuator 36 therewith until the forward end of the bell crank lever 48 strikes and is arrested by the inner end of a depressed key 30, whereupon the bell crank lever is rocked counter-clockwise to disengage the foot of the latch 47 from the driving segment 50, and at the same time, enter the forward end or nose of the latch into one of a series of notches 60 in a fixed, serrated plate 61, to lock the actuator 36 in its adjusted position. On its return movement, the drive segment 50 strikes a stud 62 on the actuator to restore the actuator to its normal position.

When in normal position, the forward end or nose of the latch lies below and spaced apart from the hooked end of the zero stop pawl 37.

As clearly set forth in Fig. 4 of the patent to Fuller, 1,242,170, above mentioned, and also in Fig. 6 of the U. S. patent to Chryst, 1,230,864, June 26, 1917, a reset spider (called a plate 646 in the Fuller patent, and a plate 340 in the Chryst patent) is associated with each differential actuator 36, a fragment only of such spider being shown in Fig. 1.

Such reset spider 75 comprises a circular skeleton disk (shown by dot-and-dash lines in Fig. 9) journaled beside the actuator 36 on the hollow stud 39 provided on each denominational hanger or bracket 40, and having a neck 64 projecting forwardly from its periphery, which neck terminates in a head 63, lying adjacent the forward end of the bell crank lever 48 and the nose of the latch 47. A stud 66 on the forward end of the bell crank lever projects through a slot in the head 63 of the reset spider to connect the reset spider to travel with the actuator 36. As set forth in the above mentioned patents to Fuller and Chryst, during total taking operations, the reset spider controls the resetting of the totalizer element by stopping the actuator when the totalizer element reaches zero. However, this forms no part of the present invention, and therefore, the reset spider and its functions are not described in detail herein.

If, during adding operations, no key 30 is depressed, the zero stop pawl 37 remains in its effective position in the path of the head 63 on the neck 64 (Fig. 1) of the reset spider 75 (Fig. 9), so that when the head 63 of the neck 64 contacts the stop pawl 37, it causes the bell crank lever 48 to rock counter-clockwise to disconnect the latch 47 from the driving segment 50, as above described.

Certain elements of the machine, such as indicators and type elements, (not shown) are differentially positioned during the operation of the machine and are adapted to be left in their adjusted positions until the next succeeding operation of the machine. To adjust these elements, (not shown), each actuator 36 is provided with a beam 67, (Fig. 1), pivotally supported at its forward end on the differentially movable actuator, the rear end of the beam being slotted to straddle a stud 68 in a differentially adjustable link 69. The lower end of the differential link 69 is pivoted to an arm 70 free on a shaft 71, extending between the machine frames, the arm 70 having a segmental gear 72 meshing with a spiral pinion 73 fast on the end of a type carrier adjusting shaft 74 extending into the printing mechanism (not shown). The upper end of the differential link 69 is pivoted to the serrated indicator adjusting and aligning segment 80 fast on the end of one of a plurality of nested sleeves 79 surrounding a shaft 81 journaled in the machine side frames.

*Totalizers*

As is customary in this type of machine, a plurality of totalizers mounted on three lines is provided, the several lines being located about the differential actuators 36. The totalizers are adapted to be selected and engaged with their respective sets of teeth on the differential actuators 36 for the purpose of accumulating thereon the various amounts registered on the machine. Totalizer selecting and engaging mechanism is omitted from this description as it forms no part of the present invention, being fully explained in the patents heretofore referred to.

It may be stated, however, that the upper totalizer line includes but one totalizer, which is an adding and subtracting totalizer of the type well known in the art, the characteristic feature of which is a plurality of pairs of totalizer pinions, each pair being geared together so that when one pinion is rotated its companion pinion is rotated an equal distance in the opposite direction, as particularly explained in the Fuller Patent, 1,242,170, heretofore referred to.

A mode of operation will be later explained whereby a subtraction may be made from the amount standing on any totalizer in the machine by use of the adding and subtracting totalizer in connection with the repeat mechanism.

The foregoing construction is old and only forms a part of the present invention insofar as it is combined with the new and novel feature now to be described.

*Repeat mechanism*

It will be remembered that the beams 67, differential links 69 and the indicator segments 80 are differentially positioned and that each part remains in its adjusted position until the beginning of the next succeeding operation.

It is proposed to lock these parts just enumerated in their adjusted positions and to utilize certain of said parts as stops for the differential mechanism, thereby causing the amount set up on the keys 30, previous to the last operation, to be added onto a selected totalizer on the next succeeding operation, under the control of the beams, without rendering it necessary to again depress the amount keys, which were released, as above explained, near the end of the operation.

In accomplishing the ultimate result, means is provided to move the zero stop pawls 37 to their ineffective positions, so that the differentials 36 may travel past their zero positions, and to provide means other than the keys 30 to against arrest the differentials in the positions to which they were adjusted on the previous operation.

An aligner bar 82 carried by arms 83, and an arm 84 (Figs. 3 and 4) of a bell crank lever 85, all loose on a shaft 86 supported in the side frames of the machine, co-operates with the several aligning segments 80 to align and lock said segments, the differential links 69, beams 67, differentials 36, and the mechanisms connected to the lower ends of the differential links 69 in their several adjusted positions.

To operate the aligner 82, a pair of cam disks 87 (Fig. 3) fast on the drive shaft 55, co-operates with rollers 88 and 89 on a lever 90 pivoted on a stud 91 projecting from the adjacent machine side frame 34. A link 92 connects the lever 90 with an arm 93 of a multiple-armed lever 94 fast on the shaft 86. The purpose of the other arms of the lever 94 is foreign to the present invention, therefore, no further mention thereof need be made herein. A hooked arm 95 of a coupling 96, pivotally supported on an arm 97 of the loosely mounted bell crank lever 85, engages a stud 98 on an arm 99 fast on the shaft 86. The cam disks 87 receive one complete rotation in a clockwise direction, as viewed in Fig. 3, at each operation of the machine, to rock the lever 90 first counter-clockwise and then clockwise, and turn the lever arm 93, shaft 86 and arm 99 first clockwise and then counter-clockwise, which, through the hooked arm 95 of the coupling 96, rocks the bell crank lever 85 clockwise to first disengage the aligner bar 82 from the segments 80 and then, after the segment has been differentially positioned, to reengage said aligner with the segments.

Figure 1:
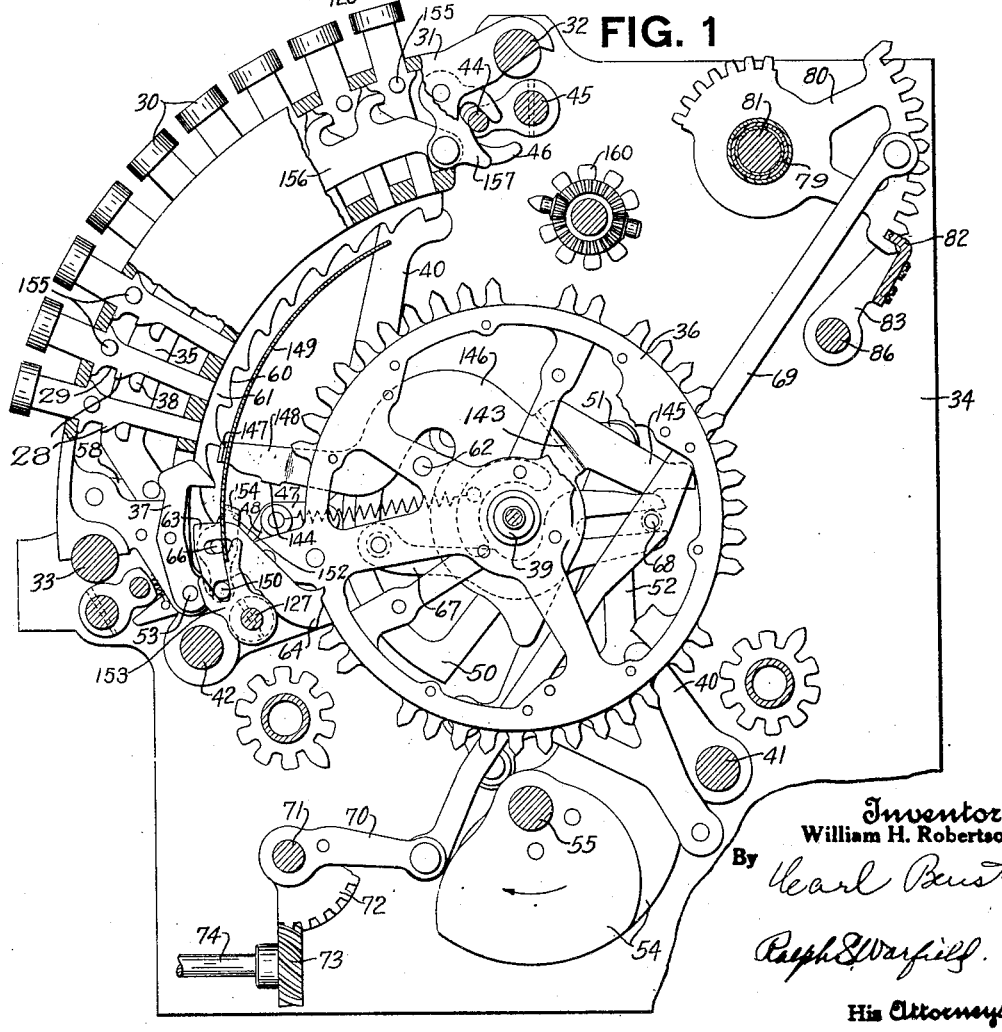
Fig. 1 is a sectional view taken through a machine of well known make, showing a bank of amount keys and the differential mechanism associated therewith in right elevation with the invention applied thereto.

Novel devices by which the above results are accomplished in the present machine, are placed under the control of a repeat key 105 (Fig. 3, which key is similar in structure to the amount keys 30 (Fig. 1). The repeat key 105 is slidably mounted in a key frame 106 removably supported by the cross rods 32 and 33 mentioned above in connection with the machine side frames 31 for the amount keys. A pin 107 on the repeat key stem projects through a slot 108 in an arm 109 pivotally supported on the key frame 106. A roller 110 on the free end of the arm 109 is adapted to traverse a cam slot 111 formed in one arm 112 of a spider lever 113 pivoted intermediate its ends on a hollow stud 104 mounted in the usual hanger or bracket 40.

Depression of the repeat key 105 rocks the arm 109 clockwise and causes the roller 110 on the arm 109 to traverse the cam slot 111 in the arm 112 of the spider lever 113 to rock the lever counter-clockwise against the tension of a spring 114. The repeat key 105 is shouldered, and when depressed, the shoulder wipes against a stud 115 on a detent bar 116, supported by links 117, 118 pivoted to the key frame 106, to shift the bar 116 and its stud against the tension of a spring (not shown) similar to spring 59 (Figs. 2 and 8) until the shoulder escapes past the stud, whereupon the spring moves the detent bar 116 toward its normal position and in so doing, interposes the stud 115 over the shoulder on the repeat key to hold the key in its depressed position.

Figure 8:
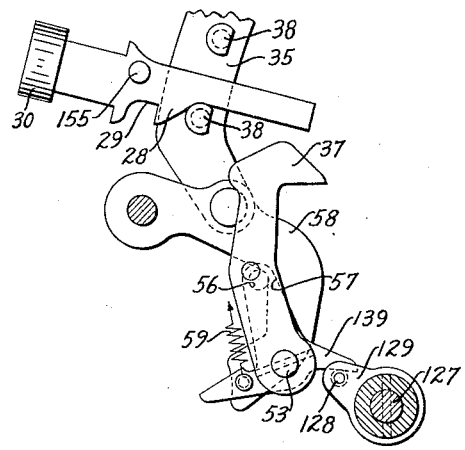
Fig. 8 is an enlarged detail view of the mechanism, operated by the amount keys, for rocking the zero stop pawls out of effective positions, and also shows a portion of the mechanism, controlled by the repeat key, for rocking the zero stop pawls out of effective positions.

An arm 120 (Fig. 3) of the spider lever 113 carries a stud 119 which projects through a slot in a crank arm 126 fast on a shaft 127 supported in the brackets 40 for the amount banks and lying adjacent the zero stop pawls 37 (Fig. 8). When, upon depression of the repeat key 105, the spider lever 113 rocks counter-clockwise, the arm 120 and stud 119 rock the crank arm 126 and shaft 127 clockwise. Thereupon, studs 128 (Figs. 2, 5 and 8) projecting from arms 129 fast on the shaft 127 contact rearwardly extending tails 139 (Fig. 8) on the arms 57 fast on the shafts 53 carrying the zero stop pawls 37, to rock these pawls counter-clockwise to their ineffective positions.

The differentials 36 can now move upwardly without obstruction, but since no amount key 30 has been depressed, it is necessary to provide other means to arrest the differentials in the various positions corresponding to the positions in which they were arrested on the last operation of the machine.

This result is conveniently achieved as follows:

It will be remembered that the beams 67, differential links 69 and the serrated indicator segments 80 are differentially positioned at each operation of the machine, in accordance with the values of the depressed keys, and that these parts are left in their last adjusted positions until the next succeeding operation. It is now proposed to retain these parts in their previously adjusted positions throughout the succeeding operation of the machine, by preventing the disengagement of the aligner 82 from the indicator segments 80. This is accomplished by means of an arm 130 (Fig. 3) extending rearwardly from the spider lever 113, which, it will be remembered, is rocked counter-clockwise by the repeat key 105. A link 131 connects the arm 130 with an arm 132 fast on a shaft 133, journaled in two brackets 134, only one of which is shown herein. An arm 136, fast on the shaft 133, carries a stud 135 which projects through a cam slot 137 in an arm 138 of the coupling 96 previously mentioned. The counter-clockwise movement of the spider lever 113, through the link 131, rocks the arm 132, shaft 133, and arm 136 clockwise, which causes the stud 135 of arm 136 to enter an offset communicating with the slot 137, and rock the coupling 96 counter-clockwise to disengage the hooked arm 95 from the stud 98 in the arm 99, thereby rendering ineffective the operating mechanism for disengaging the aligner 82 from the segments 80.

To insure that the aligner 82 will remain in engagement with the several indicator segments 80 during the repeat operation of the machine, the arm 136 on shaft 133 terminates in a nose which contacts the aligner 82 after having disabled the coupling 96 to hold the aligner in effective position, as shown in Fig. 6.

And since the repeat key 105 is locked in its depressed position, the aligner 82 is also locked against release. The aligner 82, being thereby held in engagement with the serrated segments 80, thus prevents movement of the differential links 69, their studs 68 which project through the bifurcated ends of the beams 67, and the mechanism connected to the lower ends of the links.

As a novel and improved means to arrest the differential actuators 36 in repeat operations, there is associated with each actuator a stop lever 146 (Fig. 1) enlarged intermediate its ends to form a body portion which is journaled on the hollow pivot stud 39 alongside its corresponding actuator.

Figure 10:
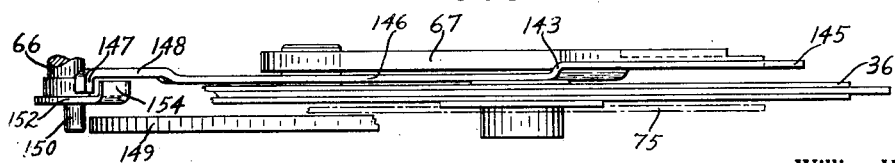
Fig. 10 is an edge elevation, in top plan, showing the relation between the beam, stop lever and tappet carried by the differential latch.

A rearwardly extending tail 145 (Figs. 1 and 10), of the stop lever 146 is bent laterally as at 143, so as to lie in the plane of the rear end of its corresponding beam 67, with which it is adapted to contact under certain conditions as will hereinafter appear.

A contact face 144 on the forward arm 148 of the stop lever 146 coacts with one end of the bell crank 48 in the operation of the machine merely to limit the idle movement of the stop lever.

During key-controlled adding operations of the machine, the stop lever 146 may occupy any position within its range of movement to which it may be shifted, such lever having no function in such operations.

Cooperating with each stop lever 146 is a tappet 152 (Figs. 1, 2 and 9) pivotally mounted intermediate its ends on the stud 66 secured to the outer end of the latch-supporting bell crank lever 48.

The tappets 152 are each provided at their upper ends with laterally turned lips 154 (Figs. 1 and 9), normally out of line with laterally turned ears 147 (Fig. 1), on the corresponding stop levers 146, and at their lower ends each tappet 152 carries a stud 150 seated in a forked arm 153 fast on the repeat key controlled shaft 127, when the machine is in its normal position of rest.

The forked arms 153 hold the tappets tilted in clockwise direction with the laterally turned lips 154 out of line with the laterally turned ears 147. In such positions of the tappets, the studs 150 are positioned so as to ride over the convex surfaces of guide rails 149 during the regular key-controlled operations of the machine, which hold the tappets with the tappet lips in idle positions relatively to the stop levers 146, as the tappets travel bodily clockwise and counter-clockwise with the differential actuators 36. Each guide rail 149 is conveniently supported on a bracket or hanger (not shown) similar to the hangers 40.

Depression of the repeat key 105 (Fig. 3) through arm 109 and spider arm 112, rocks the shaft 127 and its forked arms 153 (Fig. 1) in clockwise direction, to rock the tappets 152 counter-clockwise and position the tappet lips 154 so that as the tappets travel clockwise with the differential actuators 36, during the operation of the machine, the lips 154 will strike the ears 147 on the stop levers 146 to rock the stop levers clockwise until the tails 145 thereof are arrested by contact with the beams 67. Also during the clockwise travel of the differential actuators 36 following a depression of the repeat key, the studs 150 of the tappets lie in the rear of and follow the concave face of their guide rails 149 to lock the tappets in effective positions after they leave the forked arms 153. It will be noted that the tines of these forks extend to the lower ends of the guide rails to provide a control for the tappets at all times. Furthermore, the studs 150 on the tappets lie in recesses 164 (Figs. 2 and 9) formed in the heads 63 of the reset spider necks 64, the walls of which recesses limit the extent of rocking motion permitted the tappets 152.

Depression of the repeat key 105 prior to the ensuing operation of the machine, having locked the differential links 69 in their previously adjusted positions, the studs 68 on such links serve as fulcrums about which the beams 67 turn as their associated differential actuators 36 turn clockwise on repeat operations, until the tails 145 (Figs. 1 and 10), of the rocking stop levers 146, under the influence of the tappets 152, strike the locked beams, and disengage the latches 47 from driving segments 50, at which time the differential actuators 36 will always have been advanced to their positions of adjustment on the last previous operation of the machine.

Arrest of the tappets 152 pivoted on the studs 66 of the latch-supporting bell cranks 48 results in the disconnection of the latches 47 from the driving segments 50 and their engagement with the notched bars 61 in the same manner as heretofore explained.

The driving segments 50 restore differential actuators 36 to their normal positions in the usual manner and on such return, the actuators add onto the totalizer the amount represented by the differential positions in which the actuators were arrested on their clockwise travel, by the locked differential links 69.

In this invention, advantage has been taken of the well-known differential adjustment of the links 69 and the locking action of the usual aligning mechanism, the latter, however, being modified so as to place the release of the aligning mechanism under the control of the repeat key.

And to utilize the adjusted differential links 69, behind the differential actuators 36 as controls for the actuators, the series of normally ineffective arresting tappets 152 located in front of the actuators, are also placed under the control of the repeat key, and interponent members provided to bridge the distance between the locked differential links and the arresting tappets, and through which the coaction of the locked differential means with the tappets is effected.

When the driving segments 50 restore the differential actuators 36 counter-clockwise to their home positions, the studs 150 reenter the forked arms 153, which on adding operations, remain in the positions shown in Fig. 1. In repeat operations, in preparation for which the arms 153 are rocked clockwise by depression of the repeat key 105, the studs 150 on their return towards normal, reenter the slots in the arms 153 from the concave faces of the guide rails 149, after which the repeat key 105 is released and the spring 114 (Fig. 3) restores the spider lever 113 to its normal position, thereby rocking the shaft 127 and the arms 153 counter-clockwise to normal positions.

At the same time, the spider lever 113 lowers the link 131 (Fig. 3) and rocks the arm 132, shaft 133 and arm 136 counter-clockwise to reengage the hooked arm 95 with the stud 98 on the arm 99 to reinstate the control by the cam disks 87 of the aligner operating mechanism.

Near the end of a repeat operation, the shaft 45 (Fig. 3), rocks the bail 44 counter-clockwise and cams the link 117 toward the left to lower the detent bar 116, thereby releasing the repeat key 105 which is then restored to its undepressed position by a spring (not shown). When the key 105 is released, the spring 114 immediately restores the spider lever 113 to its normal position.

Interlocks

Should the machine be operated with the amount keys 30 and the repeat key 105 depressed at the same time, it would be possible to add an amount other than the amount represented by the keys depressed, into the selected totalizers. To prevent this possibility, an interlock is provided, as follows:

Associated with each bank of amount keys 30 and alongside the detent bar 35, is a locking bar 156, (Figs. 1, 2 and 7), the upper end of which is pivotally supported by a link 157, and the lower end of which is supported by a link 158. Links 157 and 158 are pivotally supported on the key frames 31. As is customary in the type of machine to which the present invention is shown applied, the release shaft 45 rocks clockwise at the beginning of the operation to release the machine. A slot in the link 157 supporting the locking bar 156 in its upper end, embraces the bail 44 carried by the release shaft 45.

When the release shaft 45 rocks clockwise to release the machine for operation, the bail 44 rocks the link 157 counter-clockwise and draws the locking bar 156 upwardly to engage a particular one of the plurality of hooks 159 thereon with a stud 155 on the depressed key, thereby locking the depressed key against release until near the end of the operation of the machine.

When, upon depression of an amount key 30 (Figs. 1 and 7), the link 58 supporting the lower end of the detent bar 35, rocks clockwise, a stud 166 thereon withdraws from a hooked latch 167 pivoted on the shaft 53. The spring 59 constantly urges the hooked latch 167 in a counter-clockwise direction, however, movement in this direction is normally prevented by a tail 168 on the latch 167 extending rearwardly beneath the stud 128 on the arm 129, carried by the repeat key controlled shaft 127. If, after an amount key 30 is depressed and before the machine is released for operation, the repeat key 105 is depressed, the shaft 127, will rock the arm 129 clockwise to remove the stud 128 from contact with the tail 168, whereupon the spring 59 rocks the latch 167 counter-clockwise to engage the hooked end thereof with a shoulder 169 (Figs. 2 and 7) on the link 158, supporting the locking bar 156 at its lower end, which prevents upward movement of this link and of the locking bar 156, and hence prevents movement of the link 157 (Fig. 1) supporting the upper end of the locking bar 156. With the link 157 held against movement, the bail 44 is locked against operation, and consequently, the release shaft 45 cannot turn clockwise to release the machine for operation.

Figure 7:
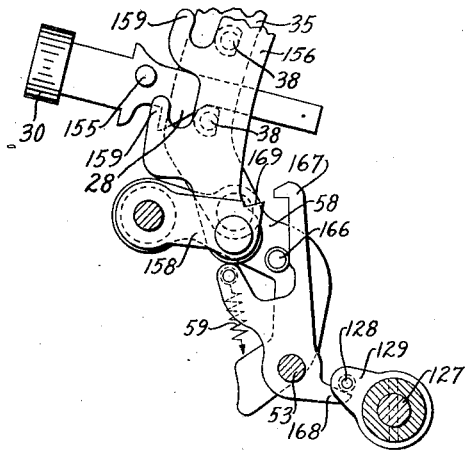
Fig. 7 is an enlarged detail view of the interlocks between the repeat key and the amount keys.

If the repeat key 105 is first depressed, the stud 166 on the link 58 continues to hold the hooked latch 167 in the position in which it is shown in Figs. 2 and 7. However, if, after the repeat key is depressed and before the machine is released for operation, an amount key 30 is depressed, the link 58 rocks clockwise and removes the stud 166 from the path of the latch 167, whereupon the spring 59 engages the latch 167 with the shoulder 169 on the link 158, to lock the machine against release, as above described.

A manually controlled key release lever (not shown) is fast on the end of the shaft 45 for the purpose of releasing erroneously depressed keys, and must be operated in each of the contingencies just above explained, before the machine can be operated.

Operation

Assuming that, on the last operation of the machine, an amount of $5.00 was added into one of the totalizers. This amount now appears on the indicator (not shown) and as the last printed amount on the detail or record strip, also not shown. If an operator now approaches the register, having a like amount of $5.00 to enter therein, he observes, by a glance at the indicator or at the record strip, that the amount of $5.00 was registered in the machine at the last operation thereof. The operator, therefore, depresses a key (not shown) for the purpose of selecting the totalizer upon which it is desired to accumulate the amount entered, and then depresses the repeat key 105. Depression of the repeat key, through shaft 127, arms 129 and studs 128, tails 139 on arms 57 fast on the zero pawl shafts 53, rocks all of the zero stop pawls 37 to their ineffective positions, and rocks the tappets 152 (Figs. 1, 2 and 9) so that the lips 154 lie in the same arcs with the ears 147 on the stop levers 146. Depression of the repeat key also disables the aligner-operating mechanism to prevent disengagement of the aligner 82 from the serrated indicator segments 80, and furthermore, positively locks the aligner in its effective position. This will hold the beams 67 in the differential positions to which they were adjusted when the amount of $5.00 was entered in the machine.

After depression of the proper totalizer selecting key (not shown) and the repeat key 105, the operator releases the machine for operation by depressing the usual motor release bar, (also not shown), whereupon drive cams 54 operate the driving segments 50 to carry the differentially movable actuators upwardly and with them the tappets 152. The lips 154 on the tappets 152 contact the ears 147 on the stop levers 146, and turn the stop levers clockwise about their pivots 39 until the tails 145 of the stop levers contact the rear ends of the beams 67, which are locked in the positions to which they were last adjusted. Thereupon the stop levers 146 are arrested, and through the contact of the tappets 152 therewith, arrest the latter and the differential actuators 36. Continued advance of the driving segments 50 rocks the bell crank levers 48 counter-clockwise in the usual manner to disconnect the latches 47 from their respective driving segments 50 and enter the forward ends of said latches into the appropriate notches 60 in the notched plates 61. The selected totalizer then engages with the actuators 36. The driving segments 50 in their counter-clockwise travel restore the actuators 36 to their normal positions, the actuators at that time, turning the totalizer wheels to accumulate thereon an amount equal to the value of the amount entered on the immediately preceding operation.

The same amount may be registered an indefinite number of times by merely depressing the repeat key 105 and the machine release key (not shown). Different totalizers may be selected upon which to accumulate the repeated amount at each repeat operation of the machine, or the amount may be repeatedly entered upon the same totalizer.

If the last preceding operation was a total or a sub-total taking operation, the total or sub-total taken from the particular totalizer, by use of the repeat key mechanism, may be transferred to or registered upon any totalizer or totalizers in the machine.

By use of the repeat key in connection with the adding and subtracting totalizer 160, subtraction may be accomplished from any totalizer in the machine in the following manner:

Let it be assumed, for instance, that the particular totalizer from which the subtraction is to be made, has an amount of $3.14 standing thereon and that it is desired to deduct 53 cents therefrom.

The "add" side of the adding and subtracting totalizer is cleared thereby setting up "9's" on all elements of the "subtract" side of the totalizer. The elements of the adding side of the totalizer will all stand at "0". To the "9's" on the subtract side is added the amount of 53 cents, which amount is set up for this purpose on the amount keys 30. The adding elements of the totalizer now stand at "999947" and the subtracting elements of the totalizer stand at "000052". The adding side of the totalizer is now cleared, thereby setting the beams 67, differential links 69 and indicator segments 80 for the amount banks to positions corresponding to the amount on the positive side of the add and subtract totalizer, that is, "999947".

The totalizer selecting key (not shown) for selecting the particular totalizer from which the deduction is to be made is now depressed. The repeat key is depressed and the machine released for operation, whereupon the amount "999947", which is the true complement of 53 cents, is added into the selected totalizer which, it will be remembered, registers "000314". The sum of "000314" and "999947" is "000261" which is the true remainder of $3.14 less 53 cents. If it is desired to deduct the same amount from the amount standing on any of the totalizers, immediately following the above operation, it is only necessary to depress the totalizer selecting key for the totalizer from which it is desired to deduct the same amount, depress the repeat key 105 and release the machine for operation, whereupon the amount will be deducted from the selected totalizer.

*Operating mechanism*

The machine may be operated by an electric motor of any conventional design having sufficient power to drive the machine. The motor is connected to the main drive shaft 55 by means of a clutch mechanism and a train of gears, none of which is illustrated herein, but well known in the art. The machine may also be operated manually by means of a crank (not shown) which also may be connected to the drive shaft 55 by a train of gears (not shown).

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:—

1. In a machine of the class described, the combination with a totalizer; a differential actuator for the totalizer; means adjustable differentially at each operation of the machine, according to the differential adjustment of the actuator; and means to releasably lock the adjustable means in adjusted position; of a repeat mechanism, including a manipulative means to disable the locking means against release; and stop means interposed between the adjustable means and the actuator, and controlled by the manipulative means, to arrest the actuator in accordance with the position occupied by the locked adjustable means.

2. In a machine of the class described, the combination with a totalizer; a differential actuator for the totalizer; means adjustable differentially at each operation of the machine, according to the differential adjustment of the actuator; and means to releasably lock the adjustable means in adjusted position; of a repeat mechanism, including a manipulative means to disable the locking means against release; a normally ineffective stop member carried by the actuator; means controlled by the manipulative means to render the stop member effective; and arresting means cooperable with the adjustable means when locked, to arrest the stop member and actuator in a position corresponding to the position of the adjustable means.

3. In a machine of the class described, the combination with a totalizer; a differential actuator for the totalizer; means adjustable differentially at each operation of the machine, according to the differential adjustment of the actuator; and means to releasably lock the adjustable means in adjusted position; of a repeat mechanism, including a manipulative means to disable the locking means against release; a normally ineffective stop member carried by the actuator; normally ineffective arresting means cooperable with the adjustable means when locked; and means controlled by the manipulative means to shift the stop member into the path of the arresting means.

4. In a machine of the class described, the combination with a totalizer; a differential actuator for the totalizer; means adjustable differentially at each operation of the machine, according to the differential adjustment of the actuator; and means to releasably lock the adjustable means in adjusted position; of a repeat mechanism, including a manipulative means to disable the locking means against release; a normally ineffective stop member shiftable relatively to the actuator; means controlled by the manipulative means to shift the stop member to its effective position; a guide to retain the stop member in either of its adjusted positions during the operation of the machine; and arresting means cooperable with the adjustable means when locked, to arrest the stop member and actuator in positions corresponding to those in which they were arrested on the last previous operation of the machine.

5. In a machine of the class described, the combination with a totalizer; a differential actuator for the totalizer; means adjustable differentially at each operation of the machine, according to the differential adjustment of the actuator; and means to releasably lock the adjustable means in adjusted position; of a repeat mechanism, including a manipulative means to disable the locking means against release; a stop member shiftable relatively to the actuator into and out of effective position; means controlled by the manipulative means to shift the stop member; and loosely mounted arresting means effective when the adjustable means is locked, to arrest the stop member and actuator as determined by the position of the adjustable means.

6. In a machine of the class described, the combination with a totalizer; a differential actuator for the totalizer; means adjustable differentially at each operation of the machine, according to the differential adjustment of the actuator; and means to releasably lock the adjustable means in adjusted position; of a repeat mechanism, including a manipulative means to disable the locking means against release; a stop member shiftable relatively to the actuator into and out of effective position; means controlled by the manipulative means to shift the stop member; and a denominational stop lever pivotally mounted alongside the denominational actuator and effective when the adjustable means is locked, to arrest the stop member and actuator in position determined by the positions of the adjustable means.

7. In a machine of the class described, the combination with a totalizer; a differential actuator for the totalizer; means adjustable differentially at each operation of the machine, according to the differential adjustment of the actuator; and means to releasably lock the adjustable means in adjusted position; of means to engage the locking means with and disengage it from the adjustable means, including a coupling; a manipulative device to disable the coupling when the locking means is in effective position; and stop means interposed between the adjustable means and the actuator and controlled by the manipulative means, to arrest the actuator according to the position occupied by the locked adjustable means.

8. In a machine of the class described, the combination with a totalizer; a differential actuator for the totalizer; means adjustable differentially at each operation of the machine, according to the differential adjustment of the actuator; and means to releasably lock the adjustable means in adjusted position; of means to engage the locking means with and disengage it from the adjustable means; a manipulative member; means controlled thereby to positively lock the locking means in effective position; and stop means interposed between the adjustable means and the actuator, and controlled by the manipulative means, to arrest the actuator according to the position occupied by the locked adjustable means.

9. In an accounting machine including a totalizer element and a differentially movable actuator therefor; the combination with a beam differentially adjusted by said actuator; means to lock the beam in its adjusted position; and means to operate said locking means; of manipulative means to disable the operating means for the locking means; a stop lever supported concentrically with the differential actuator, and adapted to cooperate with the beam; a tappet pivotally supported on the differential actuator; and means operable by the manipulative means to adjust the tappet to a position wherein the tappet is effective to cooperate with the stop lever to arrest the differential actuator under control of the beam.

10. In a repeat mechanism, the combination with a differentially movable actuator; an adjustable beam controlled thereby; and means to lock and unlock said beam in its adjusted position; of a differential stop lever cooperating with the beam; a normally ineffective tappet carried by the actuator; a manipulative member; means operated by the manipulative member to render the locking and unlocking means ineffective to unlock the beam; and means also operated by the manipulative member to render the tappet effective to cooperate with the stop lever to differentially arrest the actuator under control of the beam.

11. In a repeat mechanism, the combination with a totalizer actuator; a differentially adjustable beam; means to lock one end of the beam in its adjusted position; and operating means for said locking means; of manipulative means to render the locking means ineffective to unlock the beam; a normally ineffective tappet carried by the totalizer actuator; a stop lever pivoted concentrically with the actuator, and adapted to cooperate with both the tappet and the beam; and means controlled by the manipulative means to render the tappet effective to stop the actuator under control of the beam.

12. In a repeat mechanism, the combination with a totalizer actuator, and a beam, both of which are differentially adjustable; means to releasably lock the beam in its adjusted position; and operating means for said locking means; of a normally ineffective tappet carried by the key-controlled totalizer actuator; a stop lever mounted concentrically with said totalizer actuator; and manipulative means to disable the operating means for said locking means, and to rock the tappet to a position to cooperate with the stop lever and arrest the totalizer actuator, under the control of the previously adjusted beam.

13. In a repeat mechanism, the combination with a differentially movable actuator; a beam differentially adjustable by the actuator; a locking means to retain one end of the differentially adjusted beam in the position to which it was last adjusted; a normally ineffective tappet carried by the actuator; means to shift the tappet from its ineffective to its effective position and vice versa; a stop lever which cooperates with the locked end of the beam and in the path of the tappet when the latter is in its effective position to arrest the actuator under control of the beam; and a manipulative device to control the tappet-shifting means and the beam-locking means.

14. In a machine of the class described; the combination with a totalizer actuator, and a beam differentially adjustable under control of manipulative amount devices; of a repeat key; a pivoted lever; a stud on the key extending through a slot in said lever; a spider lever; a stud on said first-mentioned lever engaging a cam slot in said spider lever so that depression of the repeat key rocks said spider lever; a normally ineffective tappet carried by the totalizer actuator; a shaft rocked by the spider lever; a slotted arm on said shaft engaging a stud on said tappet to rock said tappet to its effective position; a normally effective locking means for the beam, operating means for said locking means; and a hooked coupling adapted to be rocked by the spider lever to disable the operating means for said locking means, whereby the beam remains locked in its last adjusted position.

15. In a machine of the class described, means to subtract a number from an ordinary adding totalizer, by setting up, on the keyboard, the true amount to be subtracted, the means including a totalizer to automatically convert the true amount set up, into the proper complementary amount, and means to transfer this amount to the adding totalizer.

16. In a machine of the class described, means to subtract a subtrahend from a minuend, the means including a totalizer having an adding and a subtracting side, means to set up the subtrahend on the subtracting side, means to clear the adding side and thus obtain the true complement of the subtrahend, and means to additively transfer this complement to a totalizer having the minuend thereon, thus in effect subtracting the true subtrahend therefrom.

In testimony whereof I affix my signature.

WILLIAM H. ROBERTSON.